(12) United States Patent
Reitsma et al.

(10) Patent No.: US 11,349,665 B2
(45) Date of Patent: May 31, 2022

(54) DEVICE ATTESTATION SERVER AND METHOD FOR ATTESTING TO THE INTEGRITY OF A MOBILE DEVICE

(71) Applicant: MOTOROLA SOLUTIONS, INC, Chicago, IL (US)

(72) Inventors: Katrin Reitsma, Chicago, IL (US); Dharamendra Kumar, Athens, GA (US); Thomas S. Messerges, Schaumburg, IL (US); Robert Horvath, Arlington Heights, IL (US); Adam C. Lewis, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 347 days.

(21) Appl. No.: 15/853,650

(22) Filed: Dec. 22, 2017

(65) Prior Publication Data
US 2019/0199530 A1 Jun. 27, 2019

(51) Int. Cl.
*H04L 9/32* (2006.01)
*H04L 9/40* (2022.01)
*H04W 12/37* (2021.01)
*H04W 12/084* (2021.01)
*H04W 12/08* (2021.01)
*H04W 12/06* (2021.01)
*H04W 12/69* (2021.01)
(Continued)

(52) U.S. Cl.
CPC .......... *H04L 9/3234* (2013.01); *H04L 9/3213* (2013.01); *H04L 9/3247* (2013.01); *H04L 9/3268* (2013.01); *H04L 63/10* (2013.01); *H04W 12/084* (2021.01); *H04W 12/37* (2021.01); *H04W 12/06* (2013.01); *H04W 12/08* (2013.01); *H04W 12/106* (2021.01); *H04W 12/69* (2021.01)

(58) Field of Classification Search
CPC ............... H04L 9/3234; H04L 9/3247; H04W 12/0804; H04W 12/0051
USPC ....................................................... 713/168
See application file for complete search history.

(56) References Cited

U.S. PATENT DOCUMENTS 6,948,061 B1 * 9/2005 Dierks ...................... H04L 9/00
9,363,241 B2    6/2016 Deutsch et al.
(Continued)

FOREIGN PATENT DOCUMENTS

EP    1873668 A1    1/2008
WO    2016181152 A1    11/2016

OTHER PUBLICATIONS

Arunkumar, S.,"Location attestation and access control for mobile devices using GeoXACML", Journal of Network and Computer Applications, 80, pp. 181-188. (Year: 2017).*
(Continued)

*Primary Examiner* — Thanhnga B Truong
*Assistant Examiner* — Angela R Holmes

(57) ABSTRACT

A device attestation server and method for attesting to the integrity of a mobile device is provided. An attestation request is sent from a mobile device to a device attestation server. The device attestation server runs an attestation method that is supported by the mobile device. The device attestation server creates an attestation token that includes a validation result and a plurality of attributes. The device attestation server sends the attestation token to the mobile device, which performs a validation method using the attestation token.

21 Claims, 2 Drawing Sheets

(51) Int. Cl.
*H04W 12/106* (2021.01)
*H04L 29/06* (2006.01)

(56) References Cited

U.S. PATENT DOCUMENTS

| | | | |
|---|---|---|---|
| 9,659,177 B1 | 5/2017 | Juels et al. | |
| 2011/0067095 A1 | 3/2011 | Leicher et al. | |
| 2011/0125894 A1* | 5/2011 | Anderson | G06F 21/31 709/224 |
| 2011/0154501 A1* | 6/2011 | Banginwar | H04L 9/3236 |
| 2011/0179477 A1 | 7/2011 | Starnes et al. | |
| 2011/0209064 A1* | 8/2011 | Jorgensen | G06F 9/54 715/733 |
| 2012/0023568 A1* | 1/2012 | Cha | H04L 63/0807 726/10 |
| 2012/0167188 A1* | 6/2012 | Poornachandran | H04W 12/06 726/7 |
| 2013/0276081 A1* | 10/2013 | Weiss | G06F 21/577 726/7 |
| 2014/0317413 A1 | 10/2014 | Deutsch et al. | |
| 2015/0089622 A1* | 3/2015 | Sondhi | H04L 63/20 726/9 |
| 2016/0087957 A1 | 3/2016 | Shah et al. | |
| 2016/0125180 A1 | 5/2016 | Smith et al. | |
| 2017/0142108 A1* | 5/2017 | Zhang | H04L 63/0884 |
| 2017/0155513 A1* | 6/2017 | Acar | G06Q 20/40145 |
| 2017/0302459 A1* | 10/2017 | Fenner | H04L 9/321 |
| 2018/0114000 A1* | 4/2018 | Taylor | G06F 21/121 |

OTHER PUBLICATIONS

Toegl, Ronald, and Michael Hutter. "An Approach to Introducing Locality in Remote Attestation Using Near Field Communications." The Journal of supercomputing 55.2 (2010): 207-227. (Year: 2010).*

The International Search Report and the Written Opinion corresponding serial No. PCT/US2018/064011 filed Dec. 5, 2018, dated Jan. 25, 2019, all pages.

Denniss, W.: OAuth 2.0 Device Posture Signals, draft-wdennis-oauth-device-posture-00, OAuth Working Group, Internet-Draft, Intended status: Standards Trac, Google, Mar. 11, 2017, Expires: Sep. 12, 2017, all pages.

* cited by examiner

DEVICE ATTESTATION SERVER AND METHOD FOR ATTESTING TO THE INTEGRITY OF A MOBILE DEVICE

BACKGROUND OF THE INVENTION

Mobile devices access sensitive data and services that should be accessed by only authorized users using devices with a known security posture. Unfortunately, unauthorized access to sensitive data and services may currently be achieved using rooted or jailbroken devices.

Many mobile devices can be rooted or jailbroken using publicly available information. The compromising of these mobile devices enables malicious actors to bypass security mechanisms and access sensitive services and data on the stolen mobile device. Examples of sensitive information include, for example, access tokens, user credentials, cookies, cryptographic keys, personal identifiable information, and classified information.

In most current systems, access to public-safety services and resources is granted based on the validity of an access token that is issued upon a successful user authentication. However, the compromised status of the mobile device from which the request originated is currently not taken into account for access control. In addition, the device status is currently not made available to other services to enable appropriate responses to enforce security policies, for example by denying or limiting access from compromised devices.

Therefore, a need exists for a method and framework for the timely tracking of the compromised status of mobile devices. Further, a need exists for a way to enforce appropriate policies for compromised mobile devices at different policy enforcement points.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
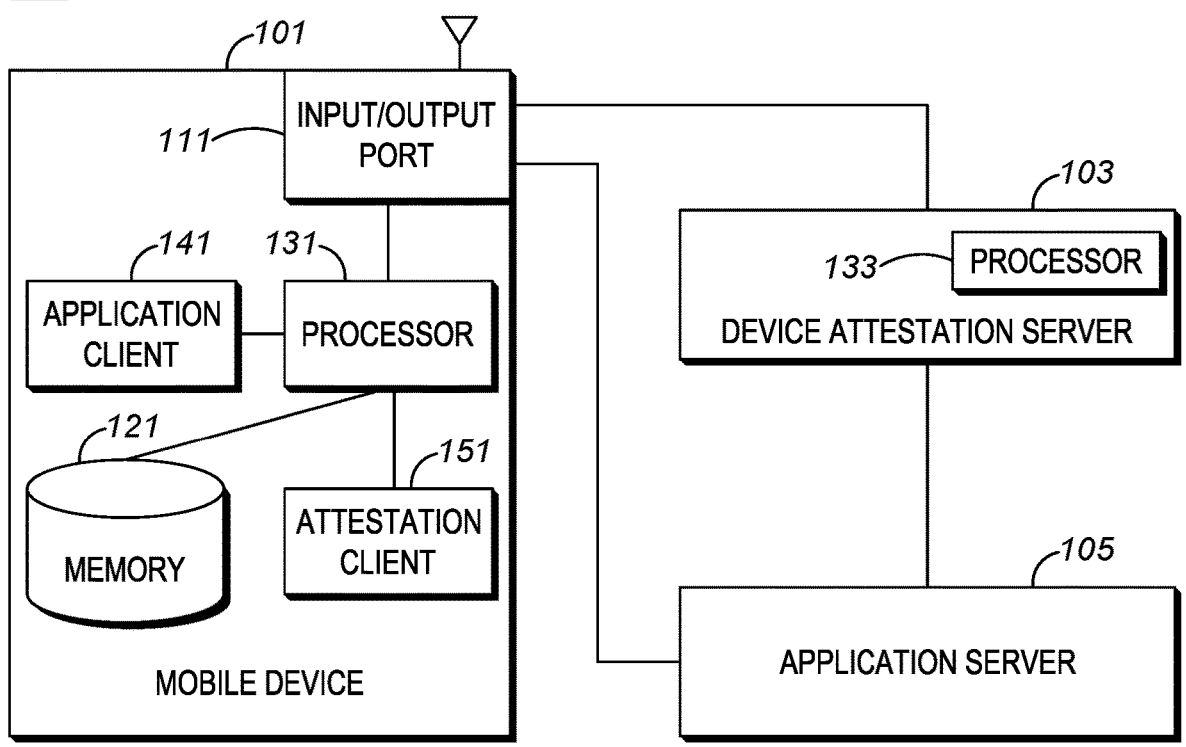
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with an exemplary embodiment, a device attestation server and method for attesting to the integrity of a mobile device is provided. Access control based on a device compromised status occurs when a universal attestation value is provided that can be validated, processed, and acted upon by any authorized entity or service, such as an Identity Management (IdM) server, an application program interface (API) Gateway or application server, or an application server or microservice, without knowledge or support of the used attestation method. As used herein, the term application server interface includes an application server, an API gateway, and an IdM server.

A first exemplary embodiment provides an attestation client that communicates with or is embedded in the application client. The application server is requesting the device attestation status from the application client before granting access to a requested service.

A second exemplary embodiment provides an extension of the first exemplary embodiment and uses Chrome Custom Tabs, Safari View Controllers, or a similar user agent (UA), and HTTP redirections in order to support web apps and web sign-ons in addition to native applications, and to remove the need to modify client applications.

A third exemplary embodiment provides the ability to integrate with existing IdM servers, such that an IdM server can be configured to issue cookies, tokens, and assertions to only devices with positive attestation results or to embed the attestation status in issued access tokens, such that the appropriate access controls can be enforced where these access tokens are consumed.

For example, an IdM server will not issue access tokens if the device attestation status indicates that the attestation check of a mobile device failed. An API Gateway will not forward requests to application servers if mobile device attestation fails. An application server will not grant access if mobile device attestation fails. An application will not launch on the device if mobile device attestation fails. An Application Server might choose to return less or different information depending on the attestation status. An Application Server or an API gateway might choose to log a security event or trigger an alert based on the attestation status.

An exemplary embodiment with IdM integration supports several policy enforcement endpoints and policy granularity. For example, the IdM server does not issue an access token if the device attestation status indicates that the device attestation failed. In this exemplary embodiment, participating application servers do not need to be modified at all. In a second exemplary embodiment, the attestation result is embedded in the access token issued by the IdM server such that the API Gateway or the application server can process that information in the access token when making an access decision. Access is granted only when both the subject identified in the access token is authorized for the service and the mobile device attestation are flagged as successful in the token. Alternately, access might be granted when only the subject identified in the token is authorized to access the service but at a lesser privilege.

In addition, the scope of an OAuth Authorization request can be used to determine whether and which type of attestation method should be requested from the attestation server. For example, for a first scope perform only user authentication, for a second scope perform user authentication and a level one device attestation, such as Google SafetyNet basic integrity or Mobile Device Management (MDM) checks. For a third scope, perform user authentication and a level two device authentication, such as Google-SafetyNet CTSprofilecheck or strong proprietary checks.

In a further exemplary embodiment, different types of attestation can be requested, e.g., indicating. For example, this can be accomplished by including them in the attestation request or by configuring the attestation server such that the server knows which method to use based on the mobile device sending the request or the application server that requests the attestation. This in effect enforces an agency policy. Therefore, the type of attestation method is included in an attestation request and provided by the mobile device or the application server or API GW based on agency policy. A further exemplary embodiment captures the case where the attestation server selects the attestation method based on agency policy for devices or apps.

In one exemplary embodiment, in order to improve the efficiency of the attestation checks, the attestation server maintains in memory the results from previous attestation requests. In this exemplary embodiment, the attestation server requests device attestation status from this memory, but can alternately be retrieved from a database.

FIG. 1 depicts a system diagram of a communication system 100 in accordance with an exemplary embodiment of the present invention. Communication system 100 preferably comprises mobile device 101, device attestation server 103, and application server 105.

Mobile device 101 can be a smart phone, a tablet, or any other mobile device. Mobile device 101 preferably comprises input/output port 111, memory 121, processor 131, and application 141, and attestation client 151.

Input/output port 111 is a port that allows data to be sent and received to electronic devices, such as mobile device 101. Input/output port 111 can be wireless or wired and use a variety of communication protocols.

Memory 121 is a memory device that serves as a repository which stores information relating to mobile device 101.

Processor 131 is preferably a microprocessor that is a multipurpose, clock driven, register based, digital-integrated circuit which accepts binary data as input, processes it according to instructions stored in its memory, and provides results as output. Microprocessors contain both combinational logic and sequential digital logic.

Application client 141 is an app running on mobile device 101 that contacts a remote service or resource that requires the attestation status of mobile device 101. Application client 141 can be a native app, a user-agent-based app (such as Javascript running within a web browser) or a user attempting to access a protected resource via a web browser.

Attestation Client 151 is preferably a library, service, piece of code, SDK (Software Development Kit), or stand-alone app that runs on the same device as the application. For example, the attestation client may be integrated in application client 141, or can alternately run as a stand-alone app on the same device. The attestation client preferably communicates with device attestation server 103 to request and receive the attestation status and pass on the result to the application client and/or receiving remote server. Attestation client 151 can run a script to determine supported attestation methods and respective parameters. This determination of supported methods can be programmed to occur at installation time of the attestation client, on launch or on demand.

Device attestation server 103 is a server that returns the attestation status of mobile device 101 upon request. Attestation server 103 preferably orchestrates the selection and execution of an attestation method or look up of a cached attestation status. A variety of attestation methods can be supported per plug-in architecture. In accordance with an exemplary embodiment, device attestation server 103 starts the supported attestation method, validates the result, creates an attestation token, and signs the attestation token.

Application server 105 is a remote server that preferably provides a service to the application client 141, such as database queries or mapping. Before granting access, application server 105 preferably requests the attestation status of mobile device 101. Application server 105 can be a stand-alone server or can reside on a policy enforcement endpoint where the token can be validated and acted upon. The policy enforcement endpoint can occur at application 141, application server 105, an API Gateway, or an IdM server. Application server 105 preferably validates the attestation result, for example by validating a token or sending the attestation result to device attestation server 103. Application server 105 preferably enforces policy based on the validated attestation result(s).

Figure 2:
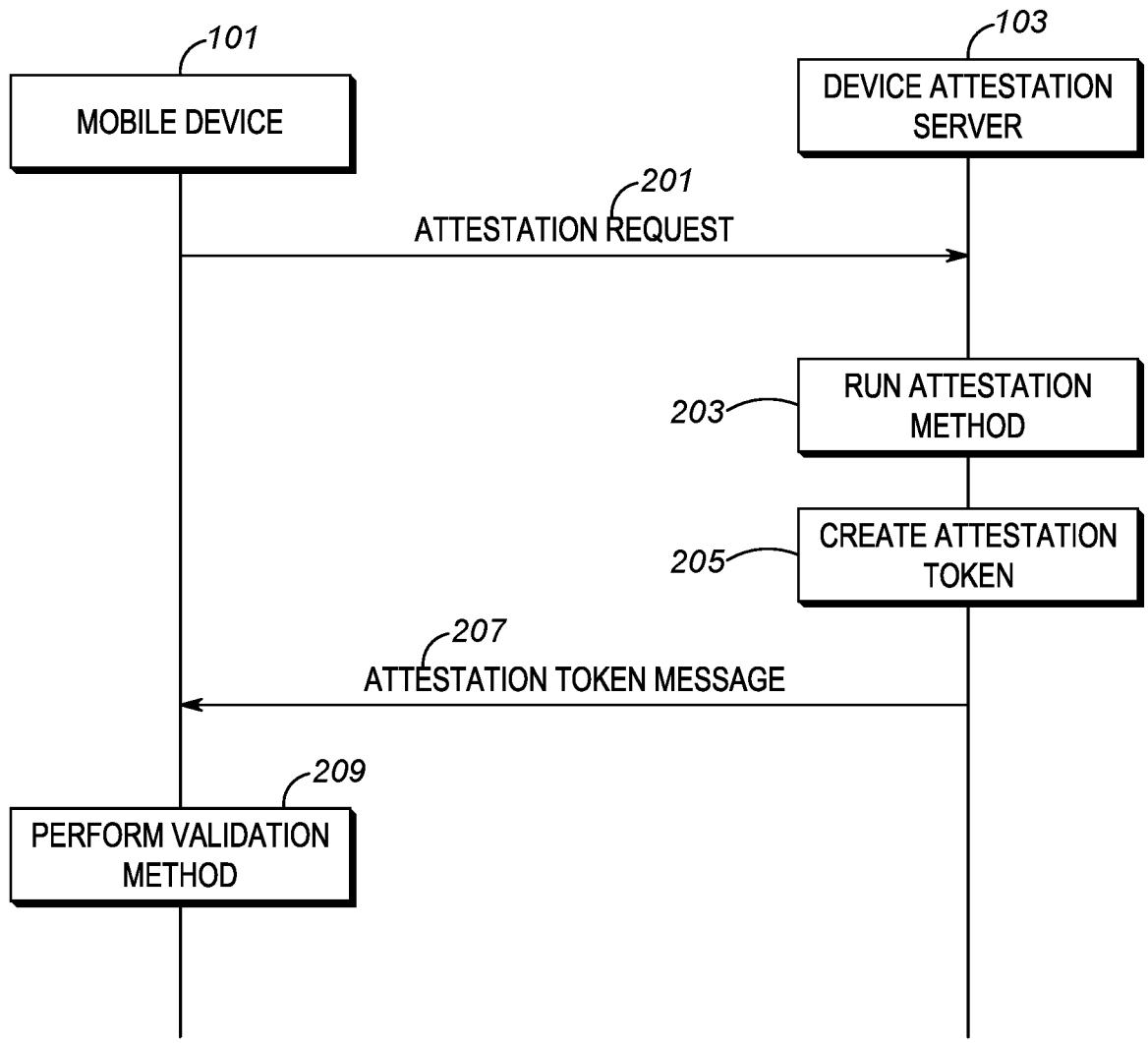
FIG. 2 depicts a call flow diagram in accordance with an exemplary embodiment of the present invention.

FIG. 2 depicts a call flow diagram 200 in accordance with an exemplary embodiment of the present invention.

Mobile Device 101 sends Attestation Request 201 to Device Attestation Server 103. Attestation Request 201 preferably includes a list of attestation methods supported on mobile device 101 together with the respective parameters and optionally other binding app/device information, including MAC addresses, International Mobile Equipment Identity (IMEI), international mobile subscriber identity (IMSI), serial numbers, device model, OS type and version, baseband version, and application name. In accordance with an exemplary embodiment, step 201 is accomplished when application server 105 sends an attestation request to application client 141 running on mobile device 101. Application client 141 sends an attestation request to attestation client 151 on mobile device 101 and attestation client 151 sends an attestation request to attestation server 103.

Device Attestation Server 103 starts (203) an Attestation Method. In accordance with an exemplary embodiment, device attestation server 103 starts one of the attestation methods that was included in attestation request 201. This attestation method is preferably chosen according to a policy located on device attestation server 103 and can include being chosen by a mobile device attestation client or an application server API Gateway as part of attestation request 201. Device Attestation Server 103 preferably validates the received attestation response.

Device Attestation Server 103 creates (205) Attestation Token. Attestation Token is a string that includes the attestation result as well as other attributes from the device attestation, such as an expiration date, a timestamp, the used attestation method(s), a device public key or certification info, a device identifier, token binding information, and information about the requesting app. In a first exemplary embodiment, the Attestation Token is signed by Device Attestation Server 103. Sample token formats include JSON Web Signature (JWS) and JSON Web Token (JWT). Device Attestation Server 103 preferably signs the attestation token Device Attestation Server 103 sends Attestation Token Message 207 to Mobile Device 101. Mobile Device 101 performs (209) Validation Method. In a first exemplary embodiment, Device Attestation Server 103 sends Attestation Token Message 207 to attestation client 151 on mobile device 101 and attestation client 151 sends it to application client 141. Application client 141 sends the attestation token to application server 105 that requested the attestation status. Alternatively the attestation token is sent to an API Gateway. The attestation token is preferably sent as part of an access request. Application server 105 preferably validates the token, both the signature and the content, and enforces an appropriate policy. The policy can include granting access if the attestation status indicates that mobile device 101 is not rooted or jailbroken or rejecting or limiting access if the status indicates that mobile device 101 has been rooted or jailbroken. In another embodiment, Device Attestation Server 103 sends Attestation Token Message 207 to attestation client 151 on mobile device 101 and attestation client 151 sends an attestation token message to application client 141. Application client 141 validates the token, both the signature and the content, and enforces an appropriate policy. The policy can include not launching, terminating, uninstalling or wiping the content of the application.

Mobile Device 101 performs (209) Validation Method.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for attesting to the integrity of a mobile device, the method comprising:
    sending an attestation request from the mobile device to a device attestation server, wherein the attestation request comprises a list of attestation methods supported on the mobile device;
    running at the device attestation server an attestation method supported by the mobile device;
    creating an attestation token at the device attestation server, the attestation token including a validation result and a plurality of attributes;
    sending the attestation token to the mobile device; and
    performing a validation method using the attestation token.

2. The method of claim 1, wherein the step of running at the device attestation server an attestation method supported by the mobile device comprises determining, at the device attestation server, which attestation methods are supported by the mobile device.

3. The method of claim 1, wherein the validation result is calculated using the result of the attestation method, a confidence level of the result of the attestation method, and the attestation method.

4. The method of claim 1, wherein the step of performing the validation method further comprises sending the attestation token together with an access request to an application server interface.

5. The method of claim 1, wherein the step of sending an attestation request from the mobile device to a device attestation server is triggered by an OAuth Authorization request to an IdM server.

6. The method of claim 1, wherein the step of sending an attestation request from the mobile device to a device attestation server is sent by a user agent on the mobile device.

7. The method of claim 1, wherein the plurality of attributes comprises one or more of a timestamp, an expiration date, an indication of the attestation method used, a confidence level, an identity of the mobile device, and token binding information.

8. The method of claim 1, wherein the step of creating the attestation token further comprises signing the attestation token.

9. The method of claim 1, wherein the attestation token includes a signature, and wherein the step of validating the attestation token at the application server comprises validating the signature.

10. The method of claim 1, wherein the step of running an attestation method comprises checking memory to determine a status of the mobile device.

11. The method of claim 4, wherein the application server interface includes an identity management (IdM) server, the method further comprising:
issuing, by the IdM server, at least one of cookies, tokens, or assertions to the mobile device in response to determining an attestation status of the mobile device, the attestation status indicating validity of the attestation token.

12. The method of claim 4, wherein the application server interface includes an identity management (IdM) server, the method further comprising:
issuing, by the IdM server, an access token embedded with an attestation status indicating validity of the attestation token.

13. The method of claim 5, wherein the list of attestation methods is determined from a scope of the OAuth Authorization request.

14. The method of claim 8, wherein the signed token is of the JSON Web Signature (JWS) format.

15. A device attestation server for attesting to the integrity of a mobile device, the device attestation server comprising:
a processor configured to:
receive an attestation request from a mobile device, wherein the attestation request comprises a list of attestation methods supported on the mobile device;
run an attestation method supported by the mobile device; and
create an attestation token, the attestation token including a validation result and a plurality of attributes; and
a transmitter configured to send the attestation token to the mobile device.

16. The device attestation server of claim 15, wherein the plurality of attributes comprises one or more of a timestamp, an expiration date, an indication of the attestation method used, an identity of the mobile device, and token binding information.

17. The device attestation server of claim 15, wherein the processor is further configured to sign the attestation token.

18. A mobile device comprising:
a transmitter configured to:
send an attestation request to a device attestation server, wherein the attestation request comprises a list of attestation methods supported on the mobile device; and
receive an attestation token including a validation result and a plurality of attributes; and
a processor configured to:
perform a validation method using the attestation token.

19. The mobile device of claim 18, wherein the plurality of attributes comprises one or more of a timestamp, an expiration date, an indication of the attestation method used, identity of the mobile device, and token binding information.

20. The mobile device of claim 18, wherein the transmitter is further configured to send the attestation token to the application server interface together with an access request.

21. The method of claim 12, further comprising:
processing, by an application server, the attestation status to make an access decision in response to the access request.

* * * * *